United States Patent
Nakajima et al.

(10) Patent No.: US 9,221,359 B2
(45) Date of Patent: Dec. 29, 2015

(54) ELECTRIC VEHICLE DRIVING FORCE CONTROL DEVICE AND ELECTRIC VEHICLE DRIVING FORCE CONTROL METHOD

(71) Applicant: NISSAN MOTOR CO., LTD., Yokohama-shi, Kanagawa (JP)

(72) Inventors: Yuki Nakajima, Yokohama (JP); Keisuke Suzuki, Fujisawa (JP); Kensuke Ito, Ebina (JP); Haruki Sato, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/383,740

(22) PCT Filed: Mar. 11, 2013

(86) PCT No.: PCT/JP2013/056628
§ 371 (c)(1),
(2) Date: Sep. 8, 2014

(87) PCT Pub. No.: WO2013/137189
PCT Pub. Date: Sep. 19, 2013

(65) Prior Publication Data
US 2015/0112531 A1    Apr. 23, 2015

(30) Foreign Application Priority Data

Mar. 12, 2012  (JP) .................................. 2012-054731

(51) Int. Cl.
*B60L 11/00*   (2006.01)
*B60L 15/20*   (2006.01)
*B60L 11/18*   (2006.01)
*B60K 7/00*    (2006.01)
*B60L 3/00*    (2006.01)
*B60K 1/04*    (2006.01)

(52) U.S. Cl.
CPC ........... *B60L 15/2036* (2013.01); *B60K 7/0007* (2013.01); *B60L 3/0061* (2013.01); *B60L 11/1803* (2013.01); *B60K 2001/0416* (2013.01); *B60K 2007/0092* (2013.01); *B60L 2220/46* (2013.01); *B60L 2240/12* (2013.01); *B60L 2240/421* (2013.01); *B60L 2240/423* (2013.01); *B60L 2240/425* (2013.01); *B60L 2250/26* (2013.01); *Y02T 10/648* (2013.01); *Y02T 10/7005* (2013.01); *Y02T 10/7275* (2013.01)

(58) Field of Classification Search
None
See application file for complete search history.

(56) References Cited

FOREIGN PATENT DOCUMENTS

| JP | 2005-204436 A | 7/2005 |
|---|---|---|
| JP | 2006-256454 A | 9/2006 |

*Primary Examiner* — Thomas Tarcza
*Assistant Examiner* — Garrett Evans
(74) *Attorney, Agent, or Firm* — Foley & Lardner LLP

(57) ABSTRACT

A driving force control device for an electric vehicle includes two motors for generating driving forces independently on left and right driving wheels corresponding to any one of a pair of front wheels and a pair of rear wheels, a motor torque limit unit capable of limiting torques of the two motors, a driving force determination unit for determining which of the driving forces of the left and right driving wheels is larger, and a motor torque control unit for correcting, when the torque limit is imposed on one of the two motors corresponding to one of the left and right driving wheels larger in driving force during a turn of the electric vehicle, the torque of another of the two motors to increase so that a total driving force of the left and right driving wheels is maintained.

5 Claims, 6 Drawing Sheets

ELECTRIC VEHICLE DRIVING FORCE CONTROL DEVICE AND ELECTRIC VEHICLE DRIVING FORCE CONTROL METHOD

TECHNICAL FIELD

This invention relates to a technology for controlling a driving force of an electric vehicle, and more particularly, to a technology for maintaining a motor temperature within a permissible temperature range, which is a temperature range that does not cause a defect in the motor.

BACKGROUND ART

There has been known a technology for increasing, in an electric vehicle for driving four wheels by individual motors, when a temperature of a motor for a left front wheel, for example, exceeds a permissible temperature and a driving force is consequently reduced while the vehicle is turning, a torque of a left rear wheel in order to maintain the yaw moment of the vehicle (see JP 2005-204436A).

SUMMARY OF INVENTION

By the way, the technology disclosed in JP 2005-204436A is applicable only to the electric vehicle having the motors for all the four wheels. If the technology of JP 2005-204436A is applied to an electric vehicle having only a part of front or rear wheels as driving wheels in order to maintain the yaw moment, the driving force of the right front wheel needs to be always reduced, resulting in a decrease in total driving force.

This invention has an object to provide a technology capable of preventing generation of a yaw moment equal to or more than a yaw moment generated during a turn of a vehicle while preventing a temperature of a motor from exceeding a permissible temperature even on an electric vehicle having only a pair of front or rear wheels as driving wheels.

According to one embodiment of this invention, there is provided a driving force control device for an electric vehicle, including: two motors for generating driving forces independently on left and right driving wheels corresponding to any one of a pair of front wheels and a pair of rear wheels; a motor torque limit unit capable of limiting torques of the two motors; a driving force determination unit for determining which of the driving forces of the left and right driving wheels is larger; and a motor torque control unit for correcting, when the torque limit is imposed on one of the two motors corresponding to one of the left and right driving wheels larger in driving force during a turn of the electric vehicle, the torque of another of the two motors to increase so that a total driving force of the left and right driving wheels is maintained.

Embodiments of the present invention and merits of the present invention will be described below in detail together with the attached drawings.

DESCRIPTION OF EMBODIMENTS

Figure 1:
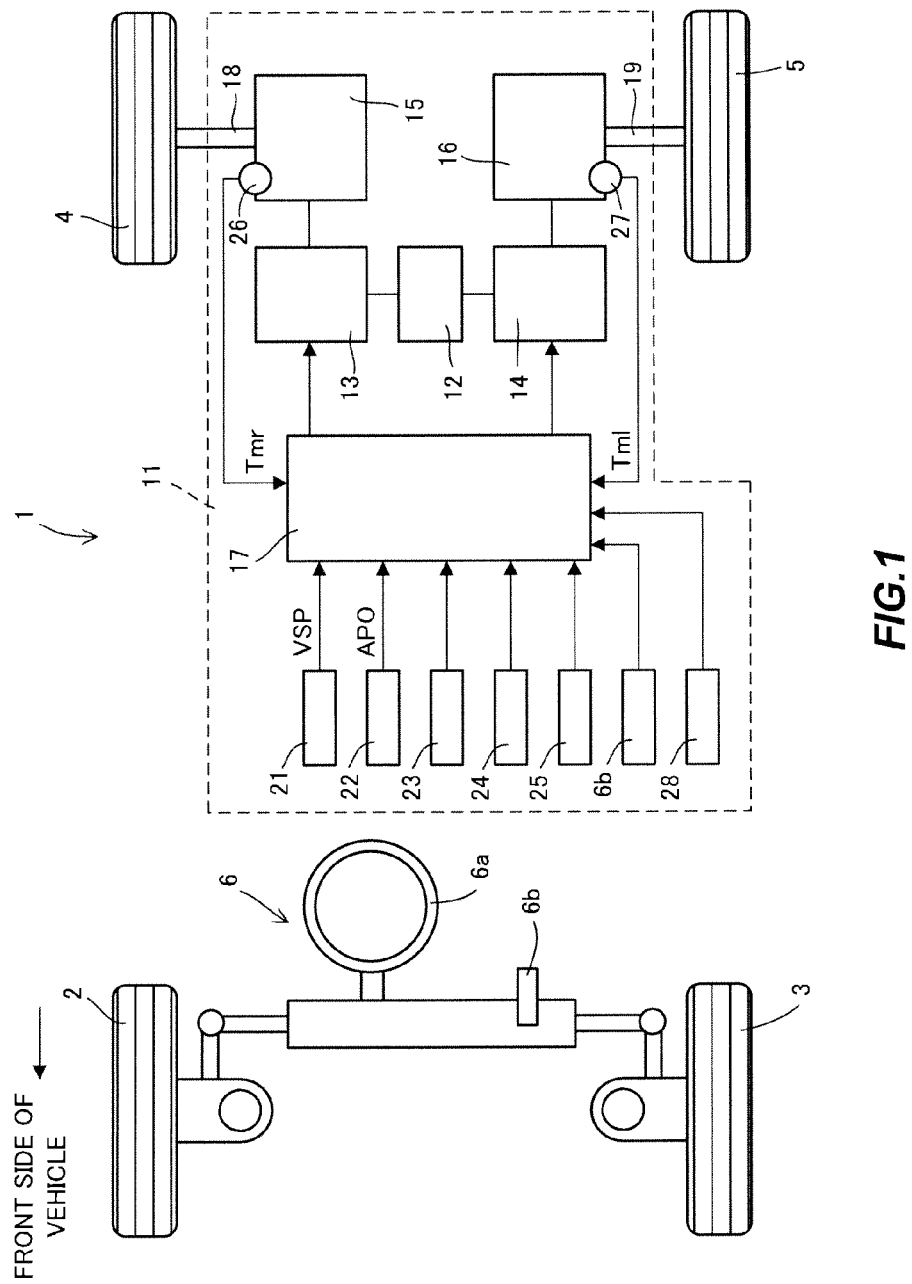
FIG. 1 is a schematic configuration diagram of an electric vehicle according to a first embodiment.

A description is now given of an embodiment of this invention referring to the drawings.

First Embodiment

FIG. 1 is a schematic configuration diagram of an electric vehicle 1 according to a first embodiment.

As illustrated in FIG. 1, the electric vehicle 1 includes front wheels 2 and 3, a steering mechanism 6, rear wheels 4 and 5, and a rear wheel drive unit 11. The pair of front wheels 2 and 3 arranged on a front side of the vehicle are steered by a steering wheel 6a of the steering mechanism 6. A steering angle sensor 6b for detecting steering angles of the front wheels 2 and 3 is arranged on the steering mechanism 6.

The pair of rear wheels 4 and 5 provided on a rear side of the vehicle are driven by the rear wheel drive unit 11. The rear wheel drive unit 11 includes a battery 12, inverters 13 and 14, motors 15 and 16, and a vehicle controller 17.

The motors 15 and 16 are provided respectively for the left and right rear wheels 4 and 5 so as to independently drive the left and right rear wheels 4 and 5. The motor 15 for driving the right rear wheel 4 is hereinafter referred to as "right rear wheel motor", the motor 16 for driving the left rear wheel 5 is hereinafter referred to as "left rear wheel motor". An electric power charged in the battery 12 is supplied via the inverters 13 and 14 provided for the respective rear wheel motors 15 and 16 to the respective rear wheel motors 15 and 16. The respective rear wheel motors 15 and 16 generate driving forces in accordance with AC voltage values output from the inverters 13 and 14, and the driving forces are respectively transmitted via output shafts 18 and 19 to the rear wheels 4 and 5 (driving wheels). It should be noted that the AC voltage values output from the inverters 13 and 14 are controlled by the vehicle controller 17 depending on an operation state of the vehicle.

The vehicle controller 17 includes a CPU, a ROM, a RAM, and an I/O interface. The vehicle controller 17 inputs outputs of various sensors such as a vehicle speed sensor 21, an accelerator pedal opening degree sensor 22, a brake pedal opening degree sensor 23, a position sensor 24, an acceleration sensor 25, and a steering angle sensor 6b. The vehicle speed sensor 21 detects a speed of the vehicle, namely, a vehicle speed VSP. The accelerator pedal opening degree sensor 22 detects an accelerator pedal opening degree APO (a depression amount of an accelerator pedal). The brake pedal opening degree sensor 23 detects a brake pedal opening degree (a depression amount of a brake pedal). The position sensor 24 detects a position of a selector lever. The accelerator sensor 25 detects an acceleration of the vehicle. The vehicle controller 17 controls the AC voltage values output from the inverters 13 and 14 to the motors 15 and 16 based on those detection values, thereby adjusting the driving forces of the respective rear wheel motors 15 and 16.

There has been known a related-art device for increasing, in an electric vehicle for driving four wheels by individual motors, when a temperature of a motor for a left front wheel, for example, exceeds a permissible temperature and a driving force is consequently reduced while the vehicle is turning, a torque of a left rear wheel in order to maintain the yaw moment of the vehicle.

However, a related-art device is applicable to an electric vehicle having motors for all of the four wheels. Therefore, as illustrated in FIG. 1, the related-art device cannot be applied to the electric vehicle 1 having the rear wheels 4 and 5 as the driving wheels (electric vehicle having only one of the pair of front wheels and the pair of rear wheels as driving wheels).

Thus, in the first embodiment, when the vehicle 1 turns, if a torque limit is imposed on a motor having a larger driving force out of the motors for the left and right wheels 4 and 5, the torque of the other motor is corrected to increase so as to maintain a total driving force of the left and right rear wheels. For example, if the torque limit is imposed on the right rear wheel motor 15, the torque of the left rear wheel motor 16 is corrected to increase so as to maintain the total driving force of the two respective rear wheel motors 15 and 16.

Figure 2A:
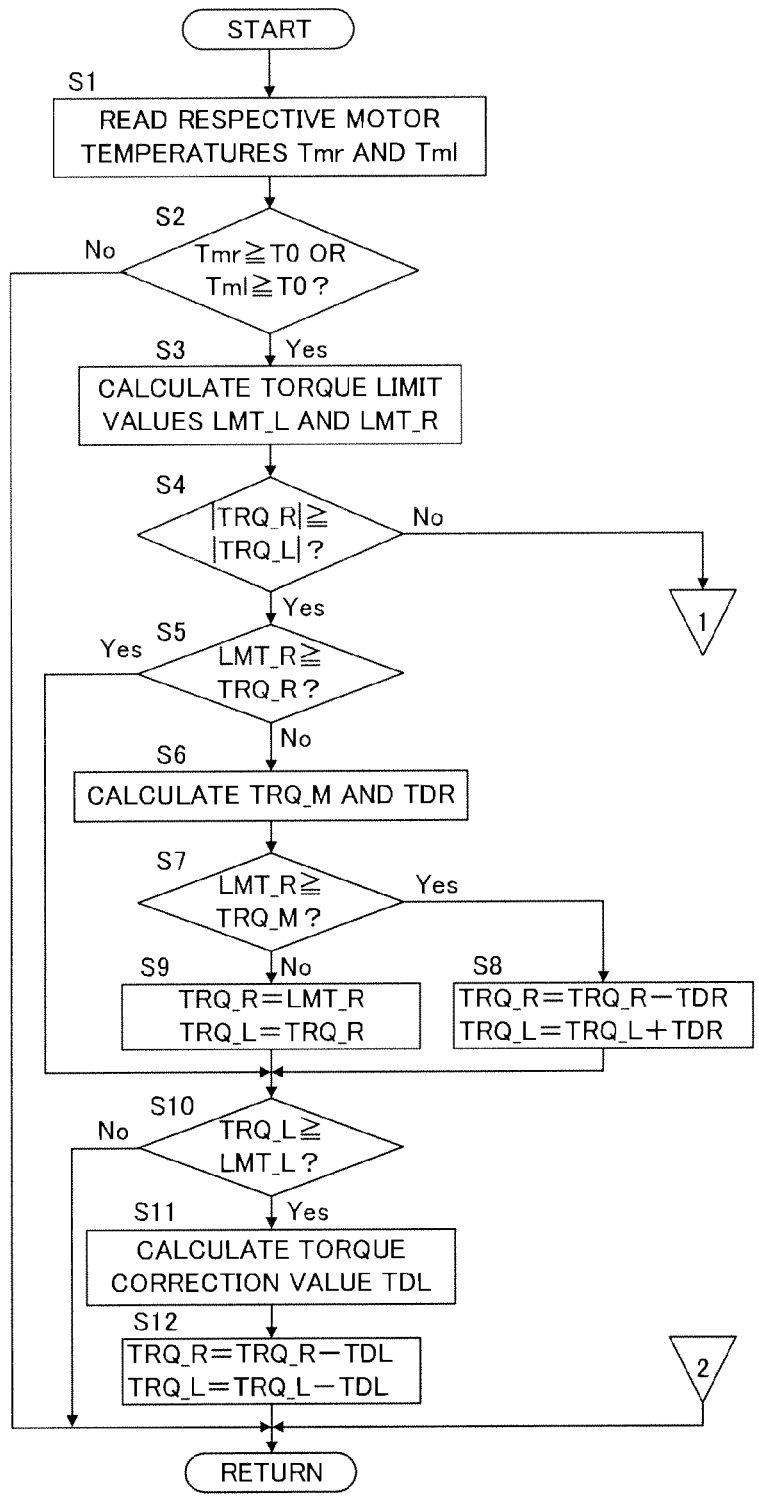
FIG. 2A is a flowchart illustrating control carried out by a vehicle controller.
Figure 2B:
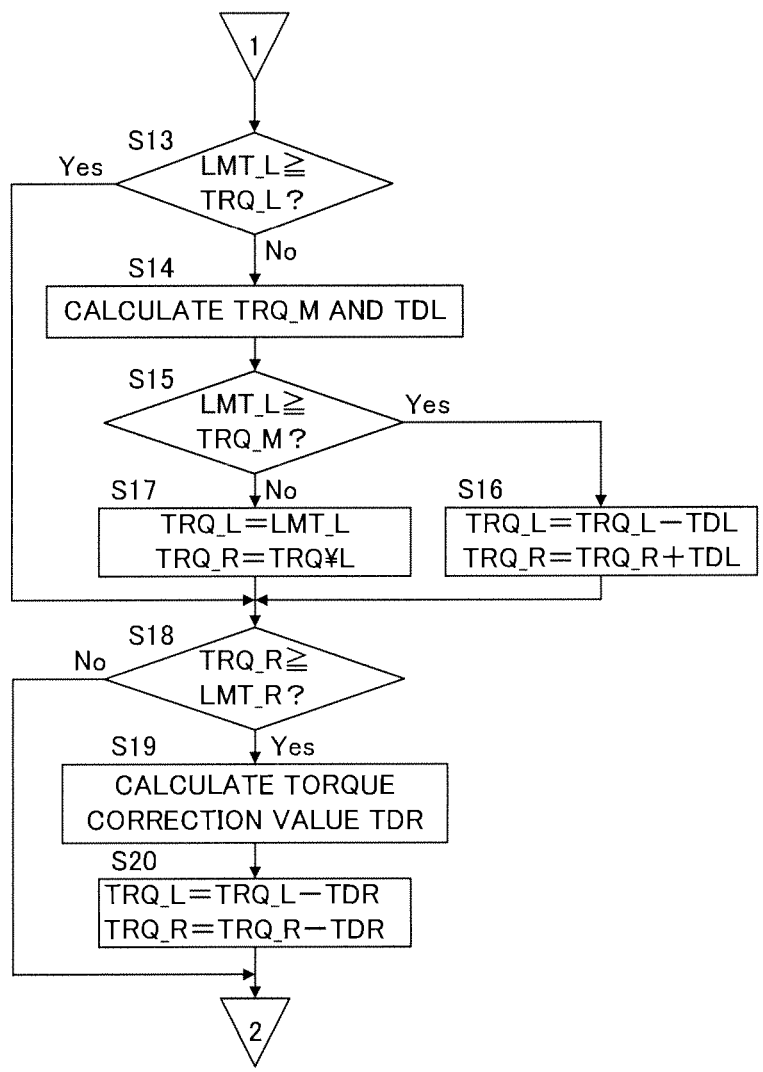
FIG. 2B is a flowchart illustrating the control carried out by the vehicle controller.

Referring to flowcharts of FIGS. 2A and 2B, a description is given of the control carried out by the vehicle controller 17. The flowcharts of FIGS. 2A and 2B are executed at every constant interval (such as every 10 milliseconds).

In Step S1, the vehicle controller 17 reads a motor temperature Tmr of the right rear wheel motor 15 and a motor temperature Tml of the left rear wheel motor 16, which are detected by the motor temperature sensors 26 and 27. On this occasion, the motor temperature includes concepts of, for example, a magnet temperature and a winding temperature. It should be noted that the read temperatures are not limited to the motor temperature, but may be an oil temperature and an inverter temperature.

In Step S2, the vehicle controller 17 compares the right rear wheel motor temperature Tmr and a permissible temperature T0 with each other, and compares the left rear wheel motor temperature Tml the permissible temperature T0 with each other. When Tmr≥T0 or Tml≥T0 holds true, the vehicle controller 17 determines that the torque limit is necessary, and proceeds to processing starting from Step S3. Otherwise, the vehicle controller 17 just finishes the processing for this time.

In Step S3, the vehicle controller 17 multiplies the motor maximum torque by respective temperature limit rates of the respective rear wheel motors, specifically, uses the following equations, to calculate torque limit values LMT_L and LMT_R for the respective rear wheel motors 16 and 15:

$$LMT\_L = TRQ\_MAX \times RATE\_L \quad (1)$$

$$LMT\_R = TRQ\_MAX \times RATE\_R \quad (2)$$

where:
LMT_L: Torque limit value for left rear wheel motor;
LMT_R: Torque limit value for right rear wheel motor;
TRQ_MAX: Motor maximum torque;
RATE_L: Temperature limit rate for left rear wheel motor; and
RATE_R: Temperature limit rate for right rear wheel motor.

Figure 3:
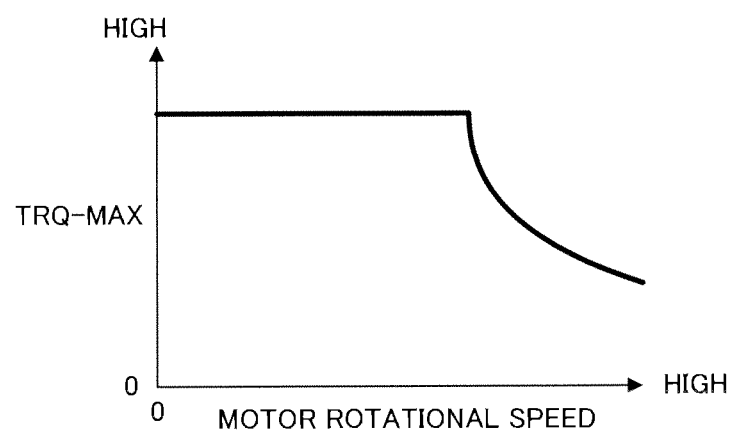
FIG. 3 is a characteristic chart of a motor maximum torque.
Figure 4:
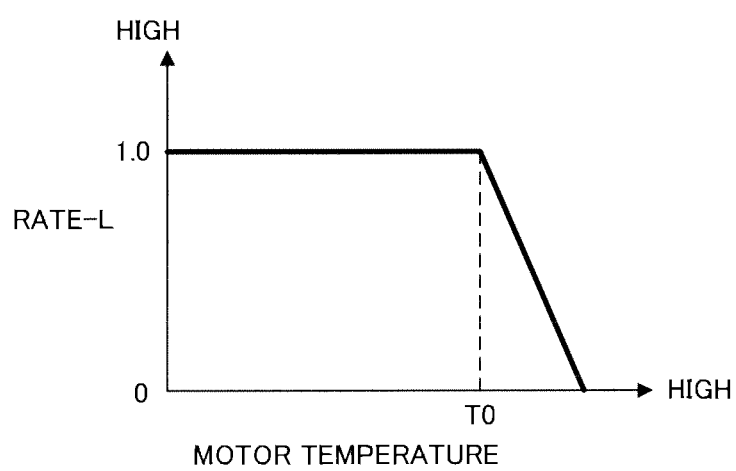
FIG. 4 is a characteristic chart of a temperature limit rate on a left wheel motor.
Figure 5:
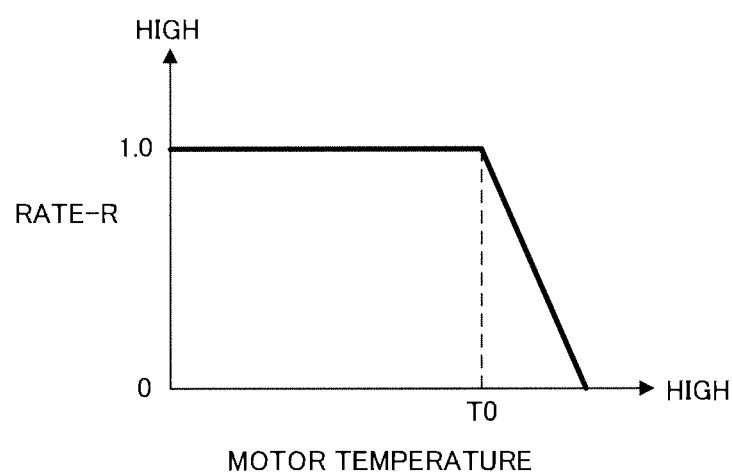
FIG. 5 is a characteristic chart of a temperature limit rate on the left wheel motor.

On this occasion, the motor maximum torque TRQ_MAX of Equations (1) and (2) is calculated by searching a table shown in FIG. 3 with the motor rotational speed. The motor rotational speed is detected by a motor rotational speed sensor 28. The temperature limit rate RATE_L for the left rear wheel motor 16 of Equation (1) is calculated by searching a table shown in FIG. 4 with the motor temperature of the left rear wheel motor 16 detected by the motor temperature sensor 27. The temperature limit rate RATER for the right rear wheel motor of Equation (2) is calculated by searching a table shown in FIG. 5 with the motor temperature of the right rear wheel motor 15 detected by the motor temperature sensor 26. As shown in FIGS. 4 and 5, the temperature limit rates RATE_L and RATE_R are each 1.0 at a temperature equal to or less than the permissible temperature T0, decrease as the motor temperature increases in a temperature range more than the permissible temperature T0, and finally become zero.

In Step S4, the vehicle controller 17 compares absolute values of command torques TRQ_R and TRQ_L of the respective two rear wheel motors 15 and 16 with each other. A state where the absolute value of the command torque TRQ_R for the right rear wheel motor 15 is equal to or more than the absolute value of the command torque TRQ_L for the left rear wheel motor 16 corresponds to a state where a moment by the motor torques is mainly imparted in a left (counterclockwise) direction of the vehicle viewed from above regardless of a turn direction of the vehicle 1. In this case, the vehicle controller 17 determines that the torque of the right rear wheel motor 15 needs to be limited due to an increase in temperature of the right rear wheel motor 15, and proceeds to processing starting from Step S5. On the other hand, a state where the absolute value of the command torque TRQ_R for the right rear wheel motor 15 is less than the absolute value of the command torque TRQ_L for the left rear wheel motor 16 corresponds to a state where the moment by the motor torques is mainly imparted in a right (clockwise) direction of the vehicle viewed from above regardless of the turn direction of the vehicle 1. In this case, the vehicle controller 17 determines that the torque of the left rear wheel motor 16 needs to be limited due to an increase in temperature of the left rear wheel motor 16, and proceeds to Steps S13 to S20 of FIG. 2B.

A description is now given of meaning of the expression: "the regardless of the turn direction of the vehicle". For example, when the vehicle is accelerated by depressing the accelerator pedal during the right turn, an understeer occurs, and the vehicle moves outward. When the torque on the left wheel is increased in order to prevent the outward motion in this case, the understeer tendency is decreased, and the turning motion is promoted more. Conversely, if the brake is applied during the turn, the vehicle presents an oversteer tendency, and tends to direct inward. In this case, when the torque on the right side is increased, the oversteer tendency is mitigated. The behavior of the vehicle can be controlled by adjusting the magnitudes of the left and right torques regardless of the turn direction in this way, and various vehicle behavior characteristics can thus be generated.

The command torques TRQ_L and TRQ_R for the respective rear wheel motors 15 are calculated as follows. Specifically, the command torque is considered as a base driving force and a moment torque separated from each other. As in the related-art electric vehicle, the base driving force is calculated by calculating a required driving force using the accelerator pedal opening degree APO and the vehicle speed VSP as parameters, and distributing halves of the required driving force respectively to the left and right driving wheels as required driving forces for the respective driving wheels. Then, the required driving force for each of the driving wheels is converted into a motor shaft torque by considering a tire radius and a gear ratio. On the other hand, the moment torque is calculated based on the accelerator pedal opening degree APO, the brake pedal opening degree, the steering angle, the vehicle speed, and the like. The respective command torques TRQ_L and the TRQ_R for the respective rear wheel motors 16 and 15 are calculated by adding/subtracting the moment torques to/from the motor shaft torques.

The absolute value of each of the command torques is used for the comparison in Step S4, and this is because the temperature of each of the rear wheel motors 15 and 16 increases when the torque acts irrespective of whether each of the rear wheel motors 15 and 16 is driving (command torque is positive) or braking (command torque is negative). In other words, the absolute value is used for the comparison to impose an optimal limit on each of the rear wheel motors 15 and 16 irrespective of whether each of the rear wheel motors 15 and 16 is driving or braking. On this occasion, the command torque for each of the rear wheel motors is used as the parameter used for determining whether the limit is to be imposed on each of the rear wheel motors 15 and 15, but the parameter is not limited to the command torque. For example, an actual torque of each of the rear wheel motors 15 and 16 can be used in place of the command torque. The actual torque of each of the rear wheel motors 15 and 16 can be acquired based on a motor current.

In Step S5, the vehicle controller 17 compares a torque limit value LMT_R for the right rear wheel motor 15 and the command torque TRQ_R for the right rear wheel motor 15 with each other. When the torque limit value LMT_R for the right rear wheel motor 15 is less than the command torque TRQR of the right rear wheel motor 15, the torque of the right rear wheel motor 15 needs to be limited. In this case, the vehicle controller 17 proceeds to Step S6, and calculates an average torque TRQM of the command torques for the two respective rear wheel motors 15 and 16 by using the following equation.

$$TRQ\_M = (TRQ\_R + TRQ\_L)/2 \quad (3)$$

In Step S6, the vehicle controller 17 calculates a value acquired by subtracting the torque limit value LMT_R from the command torque TRQR as a torque correction amount TDR used for imposing the limit on the right rear wheel motor 15. Specifically, the vehicle controller 17 calculates the torque correction amount TDR for the right rear wheel torque by using the following equation.

$$TDR = TRQ\_R - LMT\_R \quad (4)$$

In Step S7, the vehicle controller 17 compares the torque limit value LMT_R for the right rear wheel motor 15 and the average torque TRQ_M of the two respective rear wheel motors 15 and 16 with each other. When the torque limit value LMT_R for the right rear wheel motor 15 is equal to or more than the average torque TRQ_M, the vehicle controller 17 proceeds to Step S8, and carries out the torque correction for the two respective rear wheel motors 15 and 16. Specifically, the command torque is reduced (limited) by an amount corresponding to the torque correction value TDR for the right rear wheel motor 15, and thus a value acquired by subtracting the amount corresponding to the torque correction value TDR from the command torque TRQ_R for the right rear wheel motor 15 is newly set as the command torque TRQ_R for the right rear wheel motor 15. In other words, the command torque TRQ_R for the right rear wheel motor 15 is corrected to decrease by the following equation.

$$TRQ\_R = TRQ\_R - TDR \quad (5)$$

On the other hand, a value acquired by adding the torque correction value TDR to the command torque TRQ_L for the left rear wheel motor 16 is newly set as the command torque TRQ_L for the left rear wheel motor 16. In other words, the command torque TRQ_L for the left rear wheel motor 16 is corrected to increase by the following equation.

$$TRQ\_L = TRQ\_L + TDR \quad (6)$$

On this occasion, the command torque for the left rear wheel motor, which is not the motor on which the torque limit is imposed, is corrected to increase. This is because the total torque of the two respective rear wheel motors is prioritized, and the total torque of the two respective rear wheel motors 15 and 16 is maintained, thereby preventing the vehicle behavior from becoming unstable.

A description is now given of the reason for the simultaneous change in torques of the two respective rear wheel motors 15 and 16. Specifically, if the torques of the two respective rear wheel motors 15 and 16 are not changed simultaneously, the driving force or the braking force in the longitudinal direction of the vehicle changes, which appears as a longitudinal G, and is thus avoided by the simultaneous change. On the other hand, a change in the lateral direction can be considered as similar to such a case that a vehicle is moved by a lateral wind, and a travel direction is shifted more or less. A driver responds to this case by a correction of steering more or less. The torque correction value TDR is set to such an amount of moment that the driver can correct by steering more or less, and it is thus considered that the correction does not greatly affect the vehicle behavior even if the command torque for the left rear wheel motor 16 is corrected to increase. In other words, the moment amount is limited, and the vehicle behavior can thus be prevented from quickly changing On the other hand, in Step S7, the torque limit value LMT_R for the right rear wheel motor 15 is less than the average torque TRQ_M, the vehicle controller 17 proceeds to Step S9, and carries out the torque correction for the respective left and right rear wheel motors 15 and 16. On this occasion, the torque limit value LMT_R for the right rear wheel motor 15 is directly used as the torque command value TRQ_R for the right rear wheel motor 15. In other words, the torque command value TRQ_R for the right rear wheel motor 15 is calculated by the following equation.

$$TRQ\_R = LMT\_R \quad (7)$$

The torque command value TRQ_L for the left rear wheel motor 16 is calculated by the following equation so that the torque command value TRQ_L for the left rear wheel motor 16 and the torque command value TRQ_R for the right rear wheel motor 15 are equal to each other.

$$TRQ\_L = TRQ\_R \quad (8)$$

Equations (7) and (8) are used to once cancel the moment, and control the two respective rear wheel motors 15 and 16 to provide the same driving forces. However, the command torques do not reach the torque limit value LMT_R for the right rear wheel motor 15 yet, and the two respective rear wheel motors 15 and 16 are thus controlled to have the same torque value so that the driving forces are reduced without the moment. The decrease in total driving force of the two respective rear wheel motors 15 and 16 is the same as a scene/vehicle behavior where a temperature limit is imposed on a general electric vehicle having one motor.

A description is given of a reason for the difference in correction method for the torques in Step S7 between the case where torque limit value LMT_R for the right rear wheel motor 15 is equal to or more than the average torque TRQ_M and the case where the torque limit value LMT_R for the right rear wheel motor 15 is less than the average torque TRQ_M. The case where the torque limit value LMT_R is equal to or more than the average torque TRQ_M is a case where the moment torque is consequently still left. In this case, as described above in Step S8, the operation of decreasing the moment torque of the right rear wheel motor 15 on which the limit is imposed, and increasing the driving toque of the left rear wheel motor 16 on which the limit is not imposed is carried out. On the other hand, when the torque limit value LMT_R is less than the average torque TRQ_M, the driving forces themselves are reduced. As described above, the ideas are different, and thus the correction method for the torques needs to be switched.

In Step S5, when the torque limit value LMT_R for the right rear wheel motor 15 is equal to or more than the command torque TRQ_R for the right rear wheel motor 15, the torque of the right rear wheel motor 15 does not need to be limited. In this case, the vehicle controller 17 skips Steps S6 to S9, and proceeds to a torque check for the left rear wheel motor 16 in Steps S10 to S12.

In Step S10, the vehicle controller 17 compares the command torque TRQ_L for the left rear wheel motor 16 and the torque limit value LMT_L for the left rear wheel motor 16 with each other. When the command torque TRQL of the left rear wheel motor 16 is equal to or more than the torque limit value LMT_L, the torque of the left rear wheel motor 16 needs to be limited. In this case, the vehicle controller 17 proceeds to Step S11, and calculates a value acquired by subtracting the torque limit value LMT_L from the command torque TRQL of the left rear wheel motor 16 as a torque correction amount TDL for imposing the limit on the left rear wheel motor 16, specifically calculates the torque correction amount TDL for the left rear wheel torque 16 by using the following equation.

$$TDL = TRQ\_L - LMT\_L \quad (9)$$

In Step S12, the vehicle controller 17 carries out the torque correction for the respective two rear wheel motors 15 and 16. Specifically, a value acquired by subtracting the torque correction value TDL from the torque command value TRQ_R for the right rear wheel motor 15 is newly set as the torque command value TRQ_R for the right rear wheel motor 15. In other words, the vehicle controller 17 calculates the command torque value TRQ_R for the right rear wheel motor 15 by the following equation.

$$TRQ\_R = TRQ\_R - TDL \quad (10)$$

Equation (10) means that the command torque of the right rear motor 15 is set directly to the torque limit value LMT_L for the left rear wheel motor 16.

A value acquired by subtracting the torque correction value TDL from the torque command value TRQ_L for the left rear wheel motor 16 is newly set as the torque command value TRQ_L for the left rear wheel motor 16. In other words, the vehicle controller 17 calculates the command torque value TRQ_L for the left rear wheel motor 16 by the following equation.

$$TRQL = TRQ\_L - TDL \quad (11)$$

The reason for subtracting the same torque correction value TDL from the respective rear wheel motors 15 and 16 by using Equations (10) and (11) is for prioritizing the yaw rate. "Prioritizing the yaw rate" on this occasion is to prevent a yaw rate before and after the torque correction from excessively increasing by subtracting the same value (TDL) from the command torque TRQ_R of the right rear wheel motor 15 and the command torque TRQ_L of the left rear wheel motor 16. In this case, the total driving force of the motors of the left and right wheels decreases, and the motor torques may thus be corrected so as to impart a yaw moment corresponding to the total driving force as long as the yaw rate does not excessively change before and after the torque correction.

On the other hand, the operation of Steps S13 to S20 is similar to the operation of Steps S5 to S12. An operation in which the right rear wheel motor is switched to the left rear motor in the operation of Steps S5 to S12 is the operation of Steps S13 to S20. Therefore, a description of Steps S13 to S20 is omitted.

A description is now given of effects of this embodiment.

A driving force control device for an electric vehicle according to this embodiment includes: the two respective rear wheel motors 15 and 16 (motors for generating driving forces independently on left and right driving wheels corresponding to any one of a pair of front wheels and a pair of rear wheels); the vehicle controller 17 (motor torque limit unit) for limiting the torques of the respective rear wheel motors 15 and 16; a driving force determination unit (refer to Step S8 of FIG. 2A) for determining which of the driving forces of the left and right wheels is larger; and a motor torque control unit (refer to Steps S4 and S8 of FIG. 2A) for correcting, when the torque limit is imposed on the right rear wheel motor 15 (one of the two motors corresponding to one of the left and right driving wheels larger in driving force) during a turn of the vehicle 1, the torque of the left rear wheel motor 16 (another of the two motors) to increase so as to maintain the total driving force (total driving force of the left and right driving wheels) of the respective rear wheel motors 15 and 16. According to this embodiment, even when the motor torque of the right rear wheel motor 15 is limited, a yaw moment equal to or larger than the yaw moment generated during the turn of the vehicle 1 can be prevented from being generated, and instability in the vehicle behavior can thus be avoided. Moreover, when the torque limit is imposed on the right rear wheel motor 15 larger in driving force, the total driving force of the two respective rear wheel motors 15 and 16 can be maintained, and the vehicle speed can thus be maintained.

According to this embodiment, when the torque limit is imposed on the left rear wheel motor 16 smaller in driving force, the motor torque control unit corrects the motor torque (the torque of another of the two motors) of the right rear wheel motor 15 to decrease (refer to Steps S4, S10, and S12 of FIG. 2A) so as to maintain the torque difference (torque difference between the left and right driving wheels) between the two respective rear wheel motors 15 and 16. The yaw moment can thus be prevented from being unintentionally increased excessively.

According to this embodiment, which of the left and right driving wheels has a larger driving force can be determined based on the absolute values of the torques (left and right motor torques) of the two respective wheel motors 15 and 16 (refer to Step S4 of FIG. 2A). The optimal torque limit can thus be imposed irrespective of whether the vehicle 1 is driven or braking.

According to this embodiment, when the torque limit is imposed on the right rear wheel motor 15 (one of the two motors corresponding to one of the left and right driving wheels larger in driving force), the calculation of the torque limit on the right rear wheel motor 15 (motor larger in driving force) is carried out first (refer to such a point that Steps S5 to S9 are before Steps S10 to S12 in FIG. 2A). Thus, the moment amount decreases for the right rear wheel motor 15 larger in torque, but on this occasion, the torque increases due to the decrease in the moment amount for the left rear wheel motor 16 smaller in torque. Then, the total torque of the two respective rear wheel motors 15 and 16 can be adjusted depending on the state of the left rear wheel motor 16 smaller in torque, which can prevent the calculation from becoming complex.

A description has been given of the embodiment in the case of the electric vehicle having the rear wheels as the driving wheels, but this invention can be applied to an electric vehicle having front wheels as the driving wheels.

This application claims priority based on Japanese Patent Application No. 2012-054731 filed with the Japan Patent Office on Mar. 12, 2012, the entire contents of which are expressly incorporated herein by reference.

The invention claimed is:

1. A driving force control device for an electric vehicle, comprising:
    two motors configured to generate driving forces independently on left and right driving wheels corresponding to any one of a pair of front wheels and a pair of rear wheels;
    a motor torque limit unit capable of limiting torques of the two motors;
    a driving force determination unit configured to determine which of the driving forces of the left and right driving wheels is larger; and
    a motor torque control unit configured to add, when the torque limit is imposed on one of the two motors corresponding to one of the left and right driving wheels larger in driving force during a turn of the vehicle, a value acquired by subtracting a torque limit value from a torque command value for one of the two motors on which the torque limit is imposed to a torque command value for another of the two motors, thereby correcting the torque of the another of the two motors to increase.

2. The driving force control device for an electric vehicle according to claim 1, wherein the motor torque control unit corrects, when the torque limit is imposed on one of the two motors corresponding to one of the left and right driving wheels smaller in driving force, the torque of another of the two motors to reduce so as to maintain a torque difference between the left and right driving wheels.

3. The driving force control device for an electric vehicle according to claim 1, wherein the driving force determination unit determines which of the left and right driving wheels has a larger driving force based on absolute values of left and right motor torques.

4. The driving force control device for an electric vehicle according to claim 1, wherein, when the torque limit is imposed on one of the two motors corresponding to one of the left and right driving wheels larger in driving force, limit calculation for the torque of the one of the two motors limited in torque is first carried out.

5. A driving force control method for an electric vehicle, the electric vehicle comprising two motors configured to generate driving forces independently on left and right driving wheels corresponding to any one of a pair of front wheels and a pair of rear wheels;
    the driving force control method comprising the steps of:
    determining which of the driving forces of the left and right driving wheels is larger; and
    adding, when a torque limit is imposed on one of the two motors corresponding to one of the left and right driving wheels larger in driving force during a turn of the vehicle, a value acquired by subtracting a torque limit value from a torque command value for one of the two motors on which the torque limit is imposed to a torque command value for another of the two motors, thereby correcting a torque of the another of the two motors to increase.

* * * * *